（12）United States Patent
Thomas et al.

(10) Patent No.: US 8,620,057 B1
(45) Date of Patent: Dec. 31, 2013

(54) CHECK IMAGE PROCESSING

(75) Inventors: Robert Scot Thomas, Monticello, MN (US); Alan W. Hecht, Jr., Chanhassen, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 13/246,395

(22) Filed: Sep. 27, 2011

Related U.S. Application Data

(63) Continuation of application No. 11/970,312, filed on Jan. 7, 2008, now Pat. No. 8,059,881.

(51) Int. Cl.
*G06K 9/00* (2006.01)
*G06Q 40/00* (2012.01)

(52) U.S. Cl.
USPC ........... 382/137; 382/135; 382/136; 382/138; 382/139; 705/45

(58) Field of Classification Search
USPC ............................... 382/137–139; 705/35–45
See application file for complete search history.

(56) References Cited

U.S. PATENT DOCUMENTS

| | | | | |
|---|---|---|---|---|
| 5,937,084 A | * | 8/1999 | Crabtree et al. | 382/137 |
| 6,115,509 A | * | 9/2000 | Yeskel | 382/309 |
| 2003/0217005 A1 | * | 11/2003 | Drummond et al. | 705/43 |
| 2005/0129300 A1 | | 6/2005 | Sandison | |
| 2005/0213805 A1 | * | 9/2005 | Blake et al. | 382/137 |
| 2007/0086642 A1 | * | 4/2007 | Foth et al. | 382/137 |
| 2007/0288382 A1 | * | 12/2007 | Narayanan et al. | 705/45 |

OTHER PUBLICATIONS

Accredited Standards Committee X9, Inc., "X9™ Standard," Spring 2007, 4 pages.

* cited by examiner

*Primary Examiner* — Amara Abdi
(74) *Attorney, Agent, or Firm* — Merchant & Gould P.C.

(57) ABSTRACT

Systems for processing digital check image files include an image classification module programmed to review a plurality of attributes associated with a digital check image file including at least one check image, and to categorize the digital check image file into at least one category of a plurality of categories, and a decision module programmed to decide how to process the digital check image file based on the category.

7 Claims, 5 Drawing Sheets

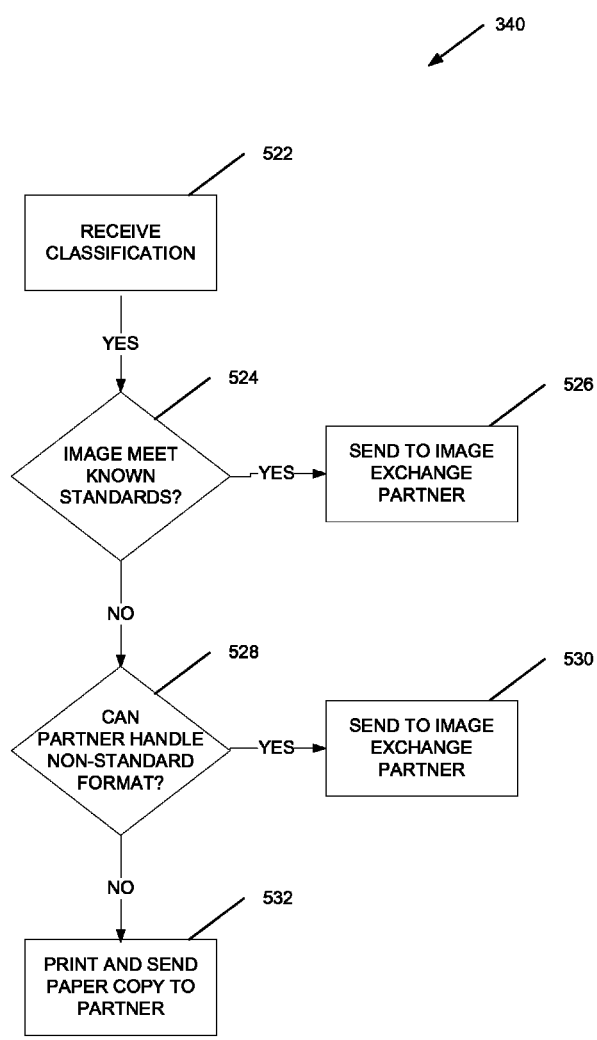

CHECK IMAGE PROCESSING

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND

Traditionally, paper checks have been used for payment in lieu of cash. Once tendered, these paper checks enter a distribution stream that routes the paper checks back to the issuing banks for payment. With the emergence of the Internet, the use of paper checks is diminishing.

The Check Clearing for the 21st Century Act (or Check 21 Act), which went into effect in October of 2004, allows the recipient of a paper check to create a digital version, thereby eliminating the need for further handling of the physical check. This process is sometimes referred to as truncation, wherein a paper check is scanned (front and back), and the scanned digital check image file is used in place of the paper check during processing and payment.

SUMMARY

Example systems and methods described herein relate to digital check image file processing. Digital check image files are examined and categorized based on certain attributes of the files. Based on this categorization, the digital check image files can be rejected, stored, forwarded to third parties, and/or printed.

In one aspect, a system for processing digital check image files includes an image classification module programmed to review a plurality of attributes associated with a digital check image file including at least one check image, and to categorize the digital check image file into at least one category of a plurality of categories, and a decision module programmed to decide how to process the digital check image file based on the category.

In another aspect, a method for processing a digital check image file includes: receiving a digital check image file including at least one check image; classifying the digital check image file into at least one category of a plurality of categories; and determining how to process the digital check image file based on the category.

In yet another aspect, a method for processing a digital check image file in a Tagged Image File Format includes: receiving a digital check image file including at least one check image; classifying the digital check image file into at least one category of a plurality of categories, the categories including a reject category including attributes that fail to meet minimum requirements, a standard category including attributes that meet most known standards, and a non-standard category including attributes that do not meet most known standards; determining how to process the digital check image file based on the category; rejecting the digital check image file if the digital check image file is categorized in the reject category; sending the digital check image file to an image exchange partner if the digital check image file is categorized in the standard category; and if the digital check image file is categorized in the non-standard category: printing the digital check image file to create a paper copy; and sending the paper copy to the image exchange partner.

DESCRIPTION OF THE DRAWINGS

Reference is now made to the accompanying drawings, which are not necessarily drawn to scale.

FIG. 5 is an example method for processing and forwarding digital check image files according to the method shown in FIG. 3.

DETAILED DESCRIPTION

Example embodiments will now be described more fully hereinafter with reference to the accompanying drawings. These embodiments are provided so that this disclosure will be thorough and complete. Like numbers refer to like elements throughout.

Example systems and methods described herein relate to digital check image file processing. Digital check image files are examined and categorized based on certain attributes of the files. Based on this categorization, the digital check image files can be rejected, stored, forwarded to third parties, and/or printed.

Figure 1:
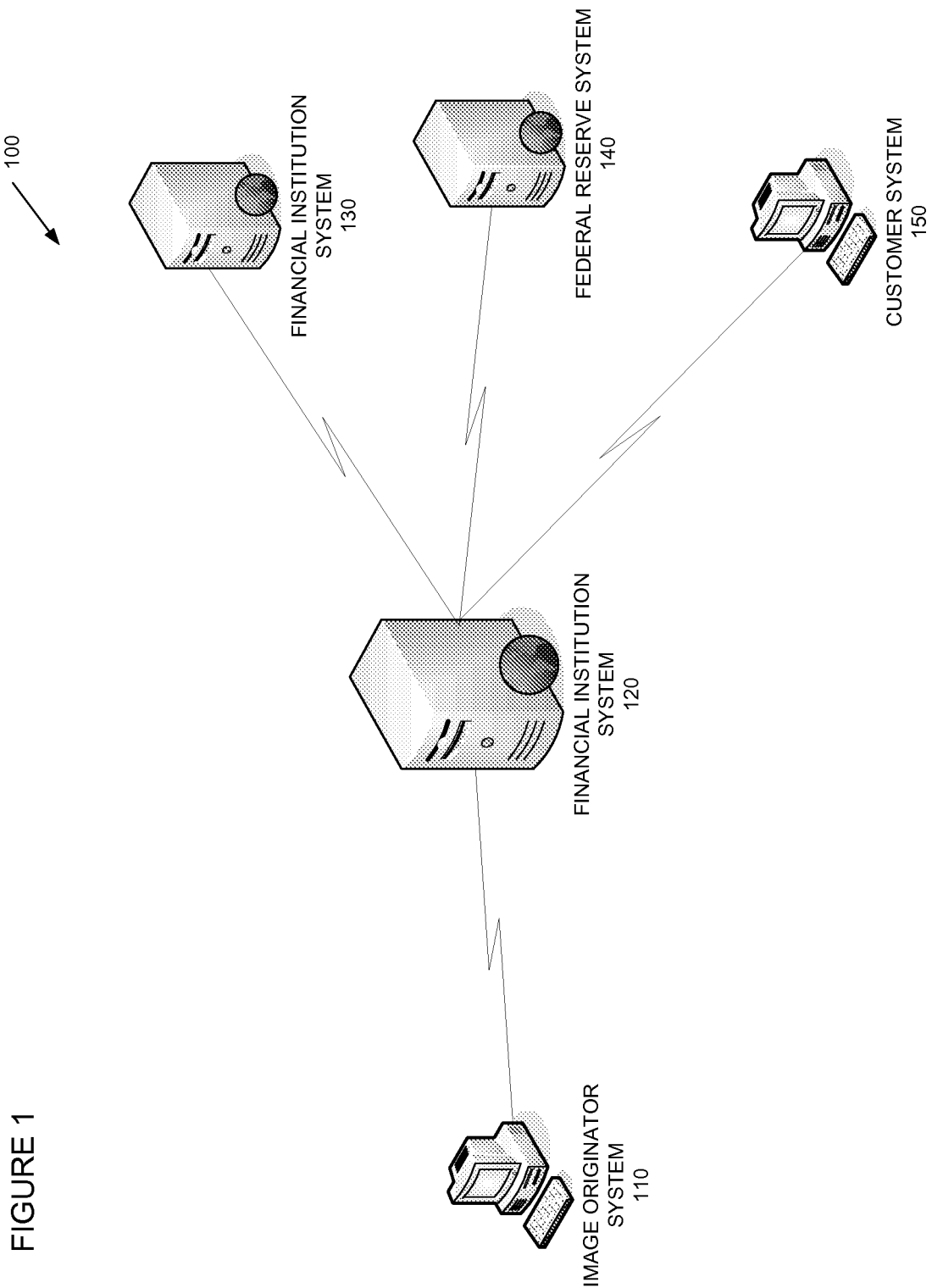
FIG. 1 is an example of a computer environment including a financial institution system programmed to process digital check image files.

Referring now to FIG. 1, an example computer environment 100 is shown. The computer environment 100 includes an image originator system 110 that creates a digital image of a paper check that is stored in a computer file, referred to herein as a digital check image file. In example embodiments, the image originator can be an individual, a merchant, a financial institution, or another third party. In one embodiment, the image originator is an individual that receives a paper check as payment and converts the check to an image file. In another embodiment, the image originator is a merchant that receives the paper check as payment for a good or a service. The merchant converts the paper check to a digital image at the point of sale, or at some point after the sale.

Typically, the digital check image file includes images of both the front and the back of one or more paper checks. In one example, the digital check image file can be created by scanning the front and the back of the paper check with a scanner to convert the paper check to a digital image that is stored in a digital check image file. The digital check image file can be created in a variety of formats. In examples described below, the digital check image file is created in the Tagged Image File Format (TIFF) according to the TIFF 6.0 specification. In other embodiments, other image formats can be used.

The image originator system 110 communicates with a financial institution system 120. In some embodiments, the financial institution is a bank to which the image originator is presenting the check for payment. The image originator system 110 communicates the digital check image file to the financial institution system 120 over one or more known protocols, as described below. For example, the image originator can be an individual that communicates the digital check image file to a financial institution at which the individual has a checking or savings account. In such an example, the individual can upload the digital check image file through the financial institution's web site for payment. Other configurations are possible.

The financial institution system 120 can process, store, and forward the digital check image file provided by the image originator system 110. For example, as described below, the financial institution can classify the digital check image file based on the attributes of the digital check image file, determine how to process the digital check image file based on the classification, and reject, store, and/or forward the digital check image file to one or more third parties such as image exchange partners.

For example, the financial institution system 120 can forward or otherwise make available the digital check image file to one or more image exchange partners, including a financial institution system 130 and a Federal Reserve System 140. The financial institution system 120 can also forward or otherwise make available the digital check image file to another customer system 150. In some embodiments, the digital check image file can be sent to the financial institution system 130, which can be a third party bank that issued the check or is otherwise slated to receive the check. The digital check image file can also be sent to the Federal Reserve System 140 as part of the check-clearing system. The digital check image file can also be made available to the customer system 150. For example, the customer associated with the customer system 150 can be the individual that originally wrote the paper check and that can access digital check image files online through the financial institution system 120.

Figure 2:
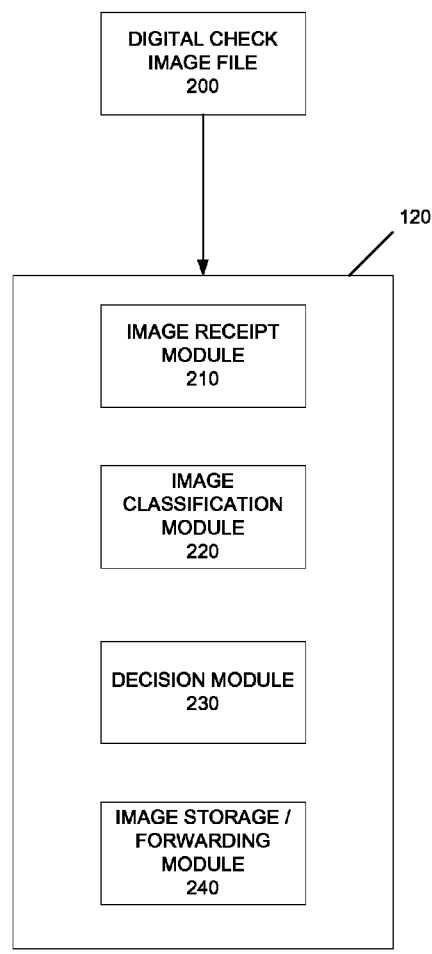
FIG. 2 is a more detailed view of the financial institution system shown in FIG. 1.

Referring now to FIG. 2, the financial institution system 120 is shown in more detail. In examples described herein, the financial institution system 120 is a computer system including a processing unit and computer readable media. Computer readable media can include memory such as volatile (such as RAM), non-volatile (such as ROM, flash memory, etc.) or some combination thereof. Additionally, the financial institution system 120 can include mass storage (removable and/or non-removable) such as a magnetic or optical disks or tape. An operating system, such as Linux or Windows, and one or more application programs can be stored on the mass storage device. The system 120 can include input devices (such as a keyboard and mouse) and output devices (such as a monitor and printer). The system 120 can also include network connections to other devices, computers, networks, servers, etc.

In example embodiments, the financial institution system 120 can communicate with other computers (e.g., the image originator system 110 and the image exchange partner systems 130, 140) through one or more networks, such as a local area network (LAN), a wide area network (WAN), the Internet, or a combination thereof. Communications can be implemented using wired and/or wireless technologies. In example embodiments, the financial institution system 120 includes one or more web servers that host one or more web sites that are accessible from the network(s). The financial institution system 120 can include one or more data stores such as, for example, one or more databases to store the digital check image files.

Referring still to FIG. 2, the financial institution system 120 is programmed to process a digital check image file 200 including one or more images of a paper check. The financial institution system 120 includes an image receipt module 210, an image classification module 220, a decision module 230, and an image storage/forwarding module 240. Each of these modules is described in more detail below.

The image receipt module 210 is programmed to receive the digital check image file 200 from the image originator system 110. For example, the image receipt module 210 is programmed to receive the digital check image file that is uploaded by the operator of the image originator system 110 using one or more protocols, such as the HyperText Transport Protocol (HTTP) or the File Transfer Protocol (FTP). Other configurations are possible.

The image classification module 220 is programmed to examine the attributes of the digital check image file and to classify the image based on the attributes. For example, if the digital check image file is in the TIFF format, the image classification module 220 can examine attributes and tags (or metadata) associated with the digital check image file. Examples of these attributes include image dimensions, image size, image orientation, image resolution, multi-stripping, and multiple image file descriptors. Based on the examination of these attributes, the image classification module 220 classifies the digital check image file into one of a plurality of categories, as described below.

In one embodiment, the image classification module 220 classifies the digital check image file into one of three categories:

(A) Rejected Images—this category is for digital check image files that do not meet minimum threshold requirements;

(B) Non-Standard Images—this category is for digital check image files that meet minimum requirements, but are not fully compatible with all systems; and (C) Standard Images—this category is for digital check image files that meet standard requirements that are broadly accepted for most or all known standards.

In example embodiments, the image receipt module 210 is programmed to categorize the digital check image file in the rejected images category if the digital check image file includes attributes that will not allow the financial institution system 120 to process the digital check image file. For example, in one embodiment, the general requirements for the digital check image file include:

(1) must conform to the TIFF 6.0 specification;
(2) must be bi-tonal (black and white);
(3) image compression must be OTT group 4;
(4) resolution must be 1 bit per pixel;
(5) coding format must be little Endian;
(6) tags must be ascending order; and
(7) posting item must have exactly one front image segment and one back image segment.

Other configurations are possible.

The image receipt module 210 is programmed to categorize the digital check image file in the non-standard images category if the digital check image file includes attributes that will allow the financial institution system 120 to process the digital check image file. In addition, the digital check image file that is categorized in the non-standard category may be accepted by some, but not necessarily all, of the other financial institutions that processes digital check image files. For example, the non-standard digital check image file may be acceptable for processing by the financial institution system 130, but not the Federal Reserve System 140.

In some examples, there can be one or more sub-categories for the non-standard category. For example, there can be a first sub-category for non-standard digital check image files that meet the requirements of a first sub-set of financial institutions, and a second sub-category for non-standard digital check image files that meet the requirements of a second sub-set of financial institutions.

In the example shown, the non-standard images category can also include a directed clearing subcategory that is triggered when the item includes one or more non-standard attributes. Such an item will be printed instead of being sent electronically.

The image receipt module 210 is programmed to categorize the digital check image file in the standard images category if the digital check image file includes attributes that will be widely accepted at most or all third party processing institutions. For example, the digital check image file can be categorized as standard if the digital check image file complies with the American National Standard (ANSI) X9.100-181 standard. The digital check image files in the standard category are typically accepted at most or all financial institutions and the Federal Reserve System.

The example table below provides one embodiment of the attributes that define the Non-Standard and Standard categories:

| Attribute | Non-Standard | Standard |
| --- | --- | --- |
| Image Dimensions | Not specified | Not specified |
| Image Size (measured by actual byte length of image after any compression) | Maximum image size is 250k front and back; and the minimum is 1 byte for each of front image and back image | Not specified |
| Image Resolution | Resolution must be in the range from 80 DPI to 240 DPI inclusive | Resolution must be either 200 DPI or 240 DPI |
| Multi-Strip Images | Multi-strip and single-strip allowed | Single-strip standard; multi-strip allowed if flagged as variant |
| Multiple Image File Descriptors (IFDs) | Multiple IFDs allowed, but only first IFD is supported (any subsequent IFDs ignored) | Only one IFD may be present |

Other configurations are possible. For example, in other embodiments, another Preferred category can be defined that is positioned between the Non-Standard and the Standard. The Preferred category includes the digital check image files that meet a higher threshold than the rejected category, but do not meet the Non-Standard category threshold. In another embodiment, as described above, a directed clearing subcategory can be defined for those digital check image files that can be cleared electronically without requiring further specialized processing. Other configurations are possible.

Referring again to FIG. 2, once the digital check image file 200 is categorized, the image classification module 220 is programmed to pass the classification to the decision module 230. In some embodiments, the classification for the digital check image file 200 can also be stored in, for example, a database, and/or the classification can be stored in a defined attribute within the digital check image file 200.

Once the classification is passed to the decision module 230, the decision module 230 is programmed to decide how to process the digital check image file 200 based on one or more rules. For example, if the digital check image file 200 is classified in the Rejected Images category, the decision module 230 is programmed to reject the image. Alternatively, if the digital check image file 200 is categorized in the Non-Standard Images or Standard Images categories, the decision module 230 is programmed to decide whether or not the digital check image file 200 can be stored and/or forwarded to one or more third parties, as described further below.

Once the decision module 230 decides how to process the digital check image file 200, the image storage/forwarding module 240 is programmed to store and/or forward the digital check image file 200 as appropriate. For example, the image storage/forwarding module 240 is programmed to store the digital check image file 200 within the financial institution system 120. In addition, depending on the output from the decision module 230, the image storage/forwarding module 240 is programmed to forward the digital check image file to one or more other institutions, such as the financial institution system 130 or the Federal Reserve System 140, as described further below.

Figure 3:
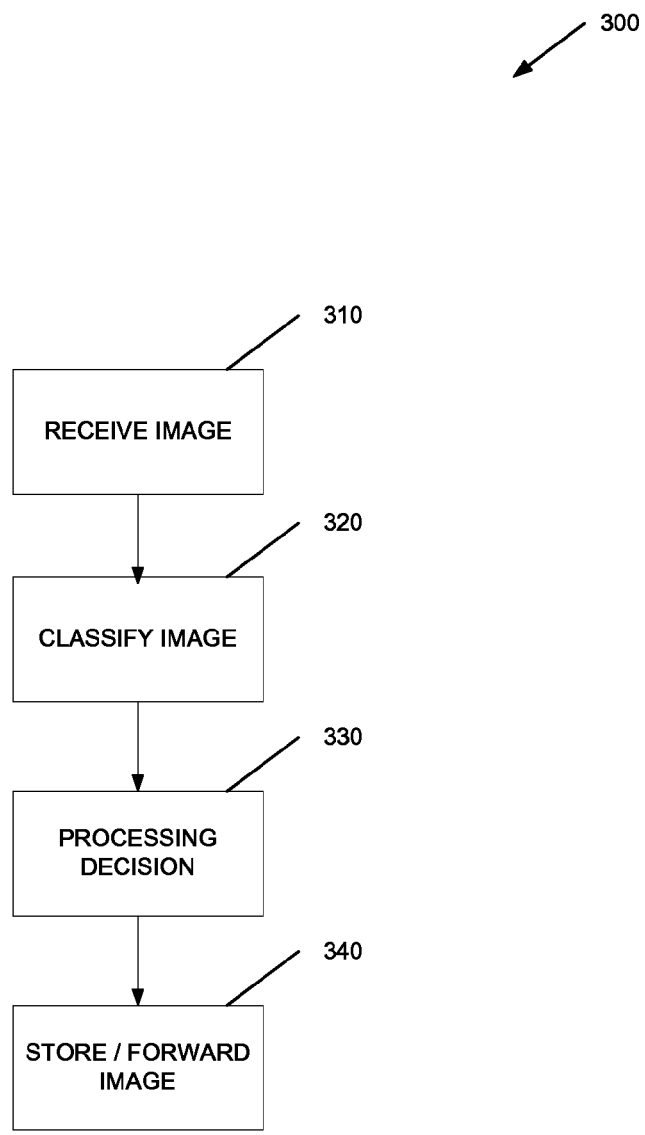
FIG. 3 is an example method for processing digital check image files.

Referring now to FIG. 3, an example method 300 for processing digital check image files is shown. The method 300 starts an operation 310, at which the digital check image file is received. Next, at operation 320, the digital check image file is classified into one of a plurality of classifications (e.g., rejected, non-standard, standard). Control is then passed to operation 330, at which a decision is made as to how to process the digital check image file. Finally, at operation 340, the digital check image file is rejected, stored and/or forwarded to another financial institution for further processing.

Figure 4:
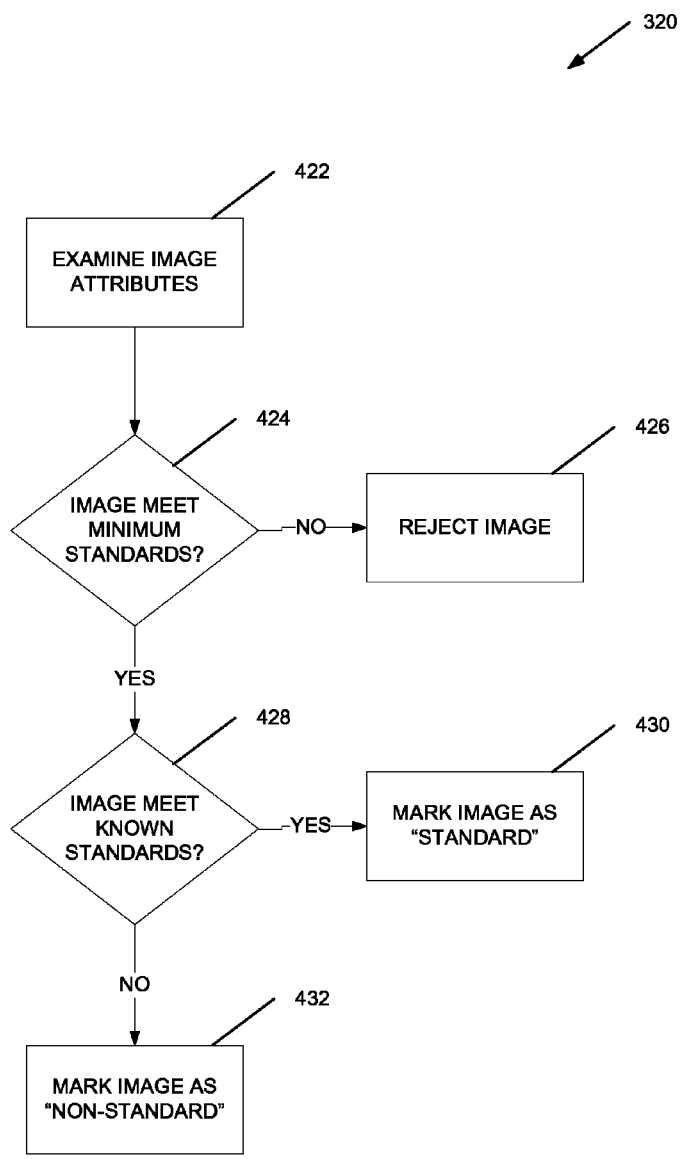
FIG. 4 is an example method for categorizing digital check image files according to the method shown in FIG. 3.

Referring now to FIG. 4, additional details regarding the categorization operation 320 are shown. At operation 422, the attributes of the digital check image file are examined such as, for example, image dimensions, image size, image orientation, image resolution, multi-stripping, and multiple image file descriptors. Next, at operation 424, a determination is made as to whether or not the digital check image file meets minimum requirements. If not, control is passed to operation 426, and the digital check image file is rejected.

If the digital check image file does meet minimum requirements, control is instead passed to operation 428. At operation 428, a determination is made as to whether or not the digital check image file meets known standards. If the digital check image file does meet known standards, control is passed to operation 430, and the digital check image file is marked as Standard to indicate that it meets known standards. If not, control is instead passed to operation 432. At operation 432, the digital check image file is marked as Non-Standard to indicate that it does not meet known standards.

Referring now to FIG. 5, additional details regarding the processing operation 330 and the forward image operation 340 of the method 300 are shown. Initially, at operation 522, the classification for the digital check image file is received. Next, at operation 524, a determination as to whether or not the digital check image file meets known standards is made. For example, the classification is read to determine if the digital check image file has been categorized as Standard. If so, control is passed to operation 526, and the digital check image file is sent to the image exchange partner.

Conversely, if the category is not Standard, control is passed to operation 528, and a determination is made as to whether or not the image exchange partner can handle a digital check image file that is categorized as Non-Standard. If so, control is passed to operation 530, and the digital check image file is sent to the image exchange partner.

Alternatively, if the image exchange partner cannot handle the Non-Standard digital check image file, control is passed to operation 532. At operation 532, the digital check image file is printed to create a paper check, and the paper check is instead sent to the image exchange partner.

In alternative embodiments, the financial institution system 120 can be programmed to modify the digital check image file if the digital check image file is rejected or categorized as Non-Standard. For example, if the digital check image file is grayscale the digital check image file can be converted to bi-tonal, or if the digital check image file includes tags that are out of order the tags can be reordered in ascending sequence. Other configurations are possible.

Other modifications to the systems and methods described herein are also possible. For example, although in the example computer environment 100 shown in FIG. 1 the financial institution system 120 receives the digital check image file directly from the image originator, in other examples the financial institution system 120 can receive the digital check image file from other entities, such as an image exchange partner like the financial institution system 130 or the Federal Reserve System 140. Other configurations are possible.

The various embodiments described above are provided by way of illustration only and should not be construed to limiting. Those skilled in the art will readily recognize various modifications and changes that may be made to the embodiments described above without departing from the true spirit and scope of the disclosure or the following claims.

What is claimed is:

1. A method for processing a digital check image file, the method comprising:
   receiving a digital check image file including at least one check image;
   classifying, by a computer system including a processing unit and computer readable media, the digital check image file into at least one category of a plurality of categories, the categories including:
      a reject category including attributes that fail to meet minimum requirements,
      an accept category including attributes that meet the minimum requirements, and
         a non-standard category including attributes that meet the minimum requirements but are not fully compatible with every system;
   determining how to process the digital check image file based on the category, including:
   rejecting the digital check image file if the digital check image file is categorized in the reject category;
   sending the digital check image file to an image exchange partner if the digital check image file is categorized in the accept category; and
   when the digital check image file is categorized in the non-standard category:
      printing the digital check image file to create a paper copy when a third party cannot process the category of the digital check image file; and
      sending the paper copy to the third party.

2. The method of claim 1, wherein receiving the digital check image file further comprises receiving the digital check image file from an image originator system.

3. The method of claim 1, wherein classifying the digital check image file includes examining at least one attribute associated with the digital check image file, the attribute including image dimension, image size, image orientation, image resolution, multi-stripping, and multiple image file descriptors.

4. A method for processing a digital check image file in a Tagged Image File Format, the method comprising:
   receiving a digital check image file including at least one check image, the digital check image file being received in a Tagged Image File Format;
   classifying, by a computer system including a processing unit and computer readable media, the digital check image file into at least one category of a plurality of categories, the categories including:
      a reject category including attributes that fail to meet minimum requirements,
      a standard category including attributes that meet the minimum requirements, and
      a non-standard category including attributes that meet the minimum requirements but are not fully compatible with every system;
   determining how to process the digital check image file based on the category;
   rejecting the digital check image file when the digital check image file is categorized in the reject category;
   sending the digital check image file to an image exchange partner when the digital check image file is categorized in the standard category; and
   when the digital check image file is categorized in the non-standard category:
      printing the digital check image file to create a paper copy; and
      sending the paper copy to the image exchange partner.

5. The method of claim 4, wherein classifying the digital check image file includes examining at least one attribute associated with the digital check image file, the attribute including image dimension, image size, image orientation, image resolution, multi-stripping, and multiple image file descriptors.

6. The method of claim 4, wherein receiving the digital check image file further comprises receiving the digital check image file from an image originator.

7. The method of claim 4, further comprising printing and sending a paper copy to the Federal Reserve System if the Federal Reserve System will not accept the category of the digital check image file.

* * * * *

UNITED STATES PATENT AND TRADEMARK OFFICE
CERTIFICATE OF CORRECTION

| | | |
|---|---|---|
| PATENT NO. | : 8,620,057 B1 | Page 1 of 1 |
| APPLICATION NO. | : 13/246395 | |
| DATED | : December 31, 2013 | |
| INVENTOR(S) | : Thomas et al. | |

It is certified that error appears in the above-identified patent and that said Letters Patent is hereby corrected as shown below:

In the Specification

Col. 4, line 41: "must be OTT group 4;" should read --must be CITT group 4--

Signed and Sealed this
Fifteenth Day of July, 2014

Michelle K. Lee
*Deputy Director of the United States Patent and Trademark Office*